United States Patent
Erofeev

(10) Patent No.: US 11,068,187 B2
(45) Date of Patent: *Jul. 20, 2021

(54) SYSTEMS AND METHODS FOR DATA MIGRATION IN A CLUSTERED FILE SYSTEM

(71) Applicant: Commvault Systems, Inc., Tinton Falls, NJ (US)

(72) Inventor: Andrei Erofeev, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/452,358

(22) Filed: Jun. 25, 2019

(65) Prior Publication Data

US 2019/0310793 A1    Oct. 10, 2019

Related U.S. Application Data

(63) Continuation of application No. 15/004,634, filed on Jan. 22, 2016, now Pat. No. 10,387,069, which is a
(Continued)

(51) Int. Cl.
*G06F 16/176*    (2019.01)
*G06F 12/0891*   (2016.01)
(Continued)

(52) U.S. Cl.
CPC .......... *G06F 3/0647* (2013.01); *G06F 3/0604* (2013.01); *G06F 3/0643* (2013.01);
(Continued)

(58) Field of Classification Search
CPC ............. G06F 12/0864; G06F 12/0891; G06F 16/1744; G06F 16/1774; G06F 2212/60;
(Continued)

(56) References Cited

U.S. PATENT DOCUMENTS 4,084,231 A    4/1978    Capozzi et al.
4,267,568 A    5/1981    Dechant et al.
(Continued)

FOREIGN PATENT DOCUMENTS

AU    2004227949    10/2004
CA    2498174    3/2004
(Continued)

OTHER PUBLICATIONS

Arneson, "Mass Storage Archiving in Network Environments" IEEE, 1998, pp. 45-50.
(Continued)

*Primary Examiner* — Mark D Featherstone
*Assistant Examiner* — Navneet Gmahl
(74) *Attorney, Agent, or Firm* — Knobbe Martens Olson & Bear LLP

(57) ABSTRACT

Systems and methods for providing more efficient handling of I/O requests for clustered file system data subject to data migration. For instance, exemplary systems can more quickly determine if certain files on primary storage represent actual file data or stub data for recalling file data from secondary storage. Certain embodiments utilize a driver cache on each cluster node to maintain a record of recently accessed files that represent regular files (as opposed to stubs). A dual-locking process, using both strict locking and relaxed locking, maintains consistency between driver caches on different nodes and the data of the underlying clustered file system, while providing improved access to the data by the different nodes. Moreover, a signaling process can be used, such as with zero-length files, for alerting drivers on different nodes that data migration is to be performed and/or that the driver caches should be flushed.

18 Claims, 5 Drawing Sheets

Related U.S. Application Data continuation of application No. 13/529,344, filed on Jun. 21, 2012, now abandoned, which is a continuation of application No. 12/722,200, filed on Mar. 11, 2010, now Pat. No. 8,209,307.

(60) Provisional application No. 61/165,109, filed on Mar. 31, 2009.

(51) Int. Cl.
*G06F 3/06* (2006.01)
*G06F 16/174* (2019.01)
*G06F 12/0864* (2016.01)

(52) U.S. Cl.
CPC ........ *G06F 3/0683* (2013.01); *G06F 12/0864* (2013.01); *G06F 12/0891* (2013.01); *G06F 16/1744* (2019.01); *G06F 16/1774* (2019.01); *G06F 2212/60* (2013.01)

(58) Field of Classification Search
CPC .... G06F 3/0604; G06F 3/0643; G06F 3/0647; G06F 3/0683
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,658,526 B2 | 12/2003 | Nguyen et al. |
| 6,721,767 B2 | 4/2004 | De Meno et al. |
| 6,760,723 B2 | 7/2004 | Oshinsky et al. |
| 6,804,719 B1 | 10/2004 | Cabrera et al. |
| 6,981,005 B1 | 12/2005 | Cabrera et al. |
| 7,003,641 B2 | 2/2006 | Prahlad et al. |
| 7,035,880 B1 | 4/2006 | Crescenti et al. |
| 7,085,904 B2 | 8/2006 | Mizuno et al. |
| 7,130,970 B2 | 10/2006 | Devassy et al. |
| 7,143,097 B1 * | 11/2006 | Olker ................ G06F 16/1774 |
| 7,162,496 B2 | 1/2007 | Amarendran et al. |
| 7,165,059 B1 | 1/2007 | Shah et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,315,923 B2 | 1/2008 | Retnamma et al. |
| 7,315,924 B2 | 1/2008 | Prahlad et al. |
| 7,380,072 B2 | 5/2008 | Kottomtharayil et al. |
| 7,386,552 B2 | 6/2008 | Kitamura et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,484,054 B2 | 1/2009 | Kottomtharayil et al. |
| 7,490,207 B2 | 2/2009 | Amarendran et al. |
| 7,500,053 B1 | 3/2009 | Kavuri et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,546,431 B2 | 6/2009 | Stacey et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,937,453 B1 * | 5/2011 | Hayden ................ G06F 16/183 709/219 |
| 8,204,859 B2 | 6/2012 | Ngo |
| 9,213,721 B1 * | 12/2015 | Faibish ................ G06F 16/185 |
| 9,727,470 B1 * | 8/2017 | Cande ................ G06F 12/084 |
| 2007/0143340 A1 * | 6/2007 | Lee ................ G06F 12/0875 |
| 2007/0179990 A1 | 8/2007 | Zimran et al. |
| 2009/0150533 A1 * | 6/2009 | McClanahan ........ G06F 16/119 709/223 |
| 2010/0191884 A1 * | 7/2010 | Holenstein .......... G06F 11/2094 710/200 |
| 2013/0024436 A1 | 1/2013 | Erofeev |
| 2015/0293699 A1 * | 10/2015 | Bromley ............... G06F 3/0649 711/161 |
| 2016/0139854 A1 | 5/2016 | Erofeev |
| 2020/0012802 A1 * | 1/2020 | Kannan ............... G06F 16/1774 |

FOREIGN PATENT DOCUMENTS

| | | |
|---|---|---|
| DE | 69415115 | 8/1999 |
| DE | 60020978 | 4/2006 |
| EP | 0259912 | 3/1988 |
| EP | 0405926 | 1/1991 |
| EP | 0467546 | 1/1992 |
| EP | 541281 | 12/1993 |
| EP | 0645709 | 3/1995 |
| EP | 0774715 | 5/1997 |
| EP | 0809184 | 11/1997 |
| EP | 0899662 | 3/1999 |
| EP | 0981090 | 2/2000 |
| EP | 1393181 | 1/2001 |
| EP | 1204922 | 5/2002 |
| EP | 1384135 | 7/2010 |
| GB | 2409553 | 6/2005 |
| GB | 2410106 | 7/2005 |
| GB | 2425199 | 10/2006 |
| GB | 2435756 | 9/2007 |
| GB | 2447361 | 9/2008 |
| IN | 226655 | 6/2007 |
| IN | 234083 | 6/2007 |
| IN | 234518 | 7/2009 |
| JP | 4267443 | 9/2004 |

(56) References Cited

FOREIGN PATENT DOCUMENTS

| JP | 4198050 | 10/2004 |
|---|---|---|
| MX | 254554 | 2/2008 |
| WO | WO 1995/013580 | 5/1995 |
| WO | WO 1999/012098 | 3/1999 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogenerous Environments", IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Mendel Rosenblum Operating Systems Review (SIGOPS), vol. 25, No. 5, May 1991, New York, US, "The Design and Implementation of a Log-Structured File System", p. 4, paragraph 3.3-p. 5.

Andrei Erofeev, U.S. Appl. No. 12/722,200, filed Mar. 11, 2010, Systems and Methods for Data Migration in a Clustered File System.

Andrei Erofeev, U.S. Appl. No. 13/529,344, filed Jun. 21, 2012, Systems and Methods for Data Migration in a Clustered File System.

Andrei Erofeev, U.S. Appl. No. 15/004,634, filed Jan. 22, 2016, Systems and Methods for Data Migration in a Clustered File System.

\* cited by examiner

SYSTEMS AND METHODS FOR DATA MIGRATION IN A CLUSTERED FILE SYSTEM

RELATED APPLICATION

This disclosure is a continuation of U.S. patent application Ser. No. 15/004,634 filed on Jan. 22, 2016, the disclosure of which is hereby incorporated by reference in its entirety and which claims the benefit of priority to U.S. patent application Ser. No. 13/529,344, filed on Jun. 21, 2012, the disclosure of which is hereby incorporated by reference in its entirety and which claims the benefit of priority to U.S. patent application Ser. No. 12/722,200, filed on Mar. 11, 2010 (now U.S. Pat. No. 8,209,307), the disclosure of which is hereby incorporated by reference in its entirety and which claims the benefit of priority under 35 U.S.C. § 119(e) of U.S. Provisional Patent Application No. 61/165,109 filed Mar. 31, 2009, which application is incorporated herein by reference in its entirety. Any and all applications for which a foreign or domestic priority claim is identified in the Application Data Sheet as filed with the present application are hereby incorporated by reference under 37 CFR 1.57.

BACKGROUND

Embodiments of the invention relate to data migration and, in particular, to systems and methods for managing access to primary or migrated data in a clustered file system environment.

Description of the Related Art

Current information management systems employ a number of different methods to perform storage operations on electronic data. For example, data can be stored in primary storage as a primary copy or in secondary storage as various types of secondary copies (e.g., backup copies, archive copies, hierarchical storage management ("HSM") copies), which are typically intended for long-term retention before some or all the data is moved to other storage or discarded.

In certain storage systems, when the data of a file is moved from primary to secondary storage, the file in primary storage is replaced with a stub file that indicates the new location of the migrated data on secondary storage. In certain examples, the stub comprises a relatively small, truncated file (e.g., several kilobytes) having the same name as the original file. The stub file can also include metadata that identifies the file as a stub and that can be used by the storage system to locate and restore the migrated data to primary storage. This stubbing process is generally performed transparently to the user by a storage service and file system driver.

Reading each file following a file system operation (e.g., read, write, rename request) to identify if the file is a stub or an actual file can be unduly time-consuming. As a result, certain stand-alone file systems can utilize an index or cache to record whether or not a recently-accessed file is a stub. However, such a configuration becomes unworkable in a clustered file system as the same file can be independently accessed and modified (e.g., migrated) by any one of various cluster nodes. That is, in the cluster configuration, caching of file/stub information becomes more cumbersome because a file system driver associated with one node of the cluster does not necessarily control or monitor all I/O paths to the stored files' data and does not know when a file has been modified or migrated by another node.

SUMMARY

In view of the foregoing, a need exists for improved systems and methods that manage access to shared data that can be moved within a storage environment, such as a clustered file system. For instance, there is a need for more efficient systems and methods for handling I/O requests for shared file system data after such data has been migrated to secondary storage.

In certain embodiments of the invention, systems and methods are disclosed that utilize a driver-based inode cache on each cluster node to maintain a record of recently accessed files that represent regular files (as opposed to stubs). Certain further embodiments of the invention implement a dual-locking process for maintaining consistency between driver caches on different nodes and the data of the underlying clustered file system. In yet further embodiments, a signaling process is used by migration systems disclosed herein for alerting file system drivers on different cluster nodes that data migration is to be performed and/or that driver caches should be flushed.

In certain embodiments, a method is disclosed for coordinating access to data in a storage management system. The method includes storing in a shared file system on a primary storage device a plurality of files comprising a first plurality of regular files and a plurality of stub files, the plurality of stub files being associated with a second plurality of regular files having been migrated to secondary storage. The method also includes maintaining in a first driver cache of a first computer a first indication of first inodes associated with at least one of the first plurality of regular files on the primary storage device and maintaining in a second driver cache of a second computer a second indication of second inodes associated with at least one of the first plurality of regular files on the primary storage device. The method further includes requesting with each of the first and second computers a read-only lock on a signal file on the shared file system to determine whether or not a migration operation is about to occur with respect to at least one of the first plurality of regular files on the primary storage device. When the request for the read-only lock on the signal file is denied of at least one of the first and second computers, the method includes clearing the respective first and/or second indications from the respective first and/or second driver caches of the at least one of the first and second computers. When the request for the read-only lock on the signal file is granted to at least one of the first and second computers, the method further includes unlocking the signal file and re-requesting the read-only lock on the signal file after a predetermined period of time.

In certain embodiments, a system is disclosed for coordinating access to data in a shared storage environment. The system comprises a first computer including a first memory storing copies of first inodes in a shared file system that represent first data files that have not been migrated from primary storage to secondary storage and a second computer including a second memory storing copies of second inodes in the shared file system that represent second data files that have not been migrated from primary storage to secondary storage, the first and second memories not storing copies of inodes that represent stub files. The system also comprises first and second file system drivers executing on, respectively, said first and second computers, each of the first and second file system drivers being configured to request a shared lock on a signal file on the shared file system. When the request for the shared lock on the signal file is denied of at least one of the first and second file system drivers, the respective copies of the first and/or second inodes are cleared from the respective first and/or second memories. When the request for the shared lock on the signal file is granted to at least one of the first and second file system drivers, the signal file is unlocked and a request for the shared lock on the signal file is made again after a predetermined period of time.

In certain embodiments, a system is disclosed for coordinating access to data in a shared storage environment. The system comprises: first means for storing on a first computing device a first indication of first inodes in a shared file system that represent first data files that have not been migrated from primary storage to secondary storage; and second means for storing on a second computing device a second indication of second inodes in the shared file system that represent second data files that have not been migrated from primary storage to secondary storage, the first and second means for storing not storing indications of inodes that represent stub files. The system also includes: third means for requesting a non-exclusive lock on a signal file on the shared file system to determine whether or not a migration operation is about to occur on data in the shared file system; and fourth means for requesting a non-exclusive lock on the signal file on the shared file system to determine whether or not a migration operation is about to occur at least on at least one of the first and second data files. When the request for the non-exclusive lock on the signal file is denied of at least one of the third and fourth means for requesting, the first and/or second indications of the, respective, first and/or second means for storing are cleared. When the request for the non-exclusive lock on the signal file is granted to at least one of the third and fourth means for requesting, the signal file is unlocked and another request is made with the at least one of the third and fourth requesting means after a predetermined period of time for the non-exclusive lock on the signal file.

In certain embodiments, a method is disclosed for coordinating access to data in a storage management system. The method comprises maintaining in a first memory of a first computer a first indication of first inodes in a shared file system that contain entire data of one or more first files. The method further includes maintaining in a second memory of a second computer a second indication of second inodes in a shared file system that contain entire data of one or more second files. The method also includes requesting with each of the first and second computers a non-blocking lock on a signal file on the shared file system, the signal file being indicative of whether or not a migration operation is occurring and/or is to occur; and when the request for the non-blocking lock on the signal file is denied of at least one of the first and second computers, clearing the respective first and/or second indication from the respective first and/or second memory of the at least one of the first and second computers, and when the request for the non-blocking lock on the signal file is granted to at least one of the first and second computers, unlocking the signal file and re-requesting the non-blocking lock on the signal file after a predetermined period of time.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF CERTAIN EMBODIMENTS

Systems and methods disclosed herein provide for improved data access management in a shared storage system. In particular, certain embodiments of the invention provide for more efficient handling of I/O requests for clustered file system data that is subject to data migration or other information life cycle management ("ILM") services. For instance, such systems can more quickly determine whether or not certain files on primary storage represent actual file data or stub data for recalling the file data from a secondary storage location.

Certain embodiments of the invention utilize a driver-based inode cache on each cluster node to maintain a record of recently accessed files that represent regular files (as opposed to stubs) on primary storage. A dual-locking process, using a combination of strict-locking and relaxed-locking procedures, can be implemented for maintaining consistency between driver caches on different nodes and the data of the underlying clustered file system, while also providing improved access to the data by the different nodes. Moreover, a signaling process can be used, such as with zero-length files, for alerting file system drivers on different cluster nodes that data migration is to, and/or can, be performed and/or that the driver caches should be flushed.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Figure 1:
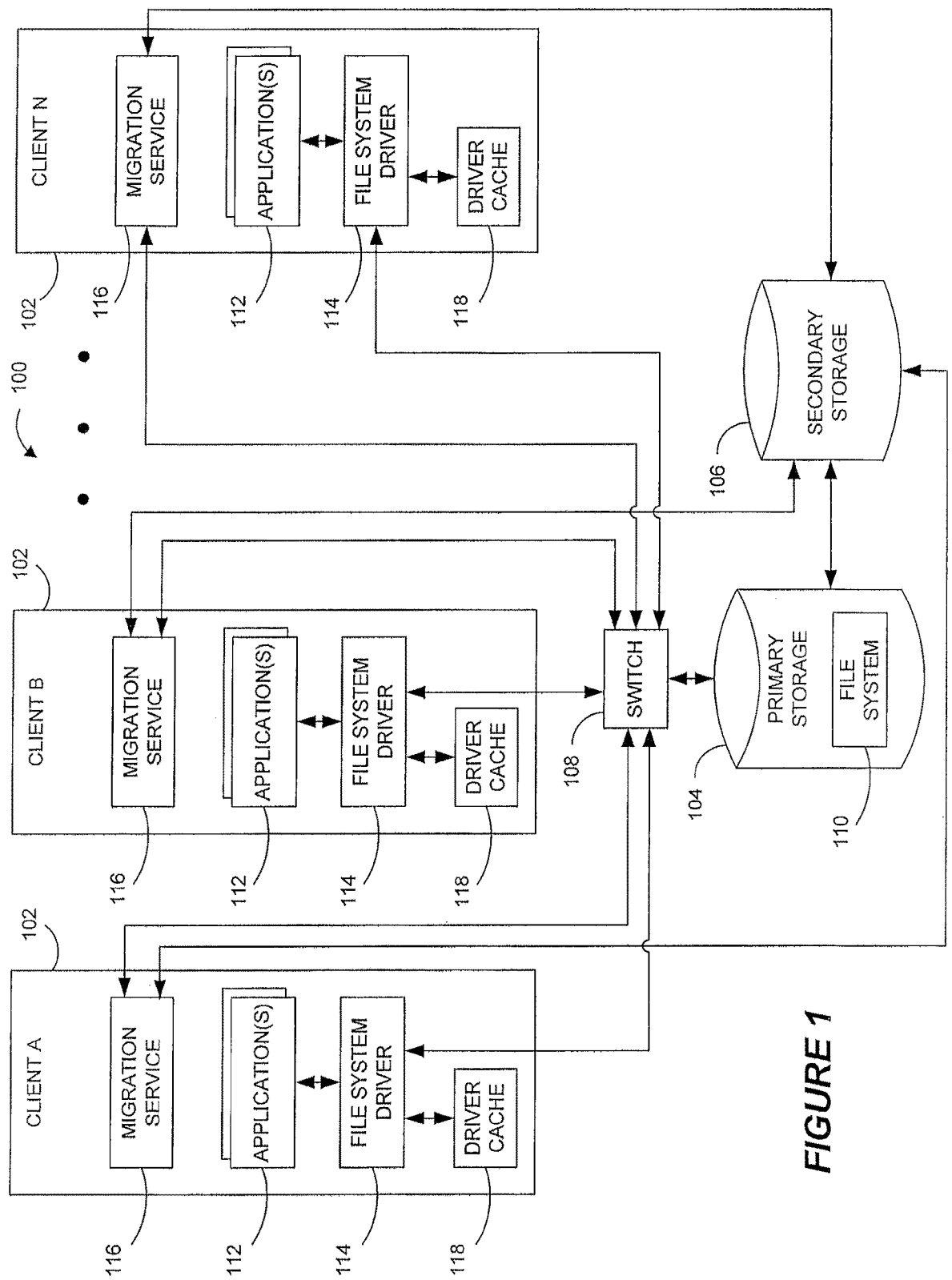
FIG. 1 illustrates an exemplary block diagram of a data migration system for a clustered file system, according to certain embodiments of the invention.

FIG. 1 illustrates an exemplary block diagram of a data migration system 100, according to certain embodiments of the invention. In certain embodiments, the data migration system 100 advantageously expedites the processing of file system requests by: (1) accessing data in primary storage, or (2) restoring migrated data from secondary storage. For instance, the data migration system 100 can facilitate determining whether or not a requested file on primary storage comprises the actual file data or a stub file.

As shown, the data migration system 100 comprises a shared storage configuration, such as a clustered file system environment. For instance, the data migration system 100 can comprise a distributed file system in which a plurality of servers transparently provides services to a plurality of clients. In certain embodiments, the data migration system 100 comprises a UNIX clustered file system that operates, for example, according to the Portable Operating System Interface (POSIX) standard. In certain embodiments, the data migration system 100 can comprise a General Parallel File System (GPFS), a PolyServe file system, a common file system (CFS), combinations of the same or the like.

The illustrated data migration system 100 includes a plurality of client systems or devices 102 that communicate with a primary storage 104 and a secondary storage 106 through a switch 108. In certain embodiments, the client devices 102 can comprise any computing device capable of accessing and/or processing data on a storage volume. In certain embodiments, the client devices 102 comprise server computers. In yet other embodiments, each client device 102 can comprise a workstation, a personal computer, a cell phone, a portable computing device, a handheld computing device, a personal digital assistant (PDA), combinations of the same or the like.

The primary storage 104 can include any type of media capable of storing data. For example, the primary storage 104 can comprise magnetic storage, such as a disk or a tape drive, or other type of mass storage. In certain embodiments, the primary storage 104 can comprise one or more storage volumes that include physical storage disks defining an overall logical arrangement of storage space. For instance, disks within a particular volume may be organized as one or more groups of redundant array of independent (or inexpensive) disks (RAID). In certain embodiments, the primary storage 104 can include multiple storage devices of the same or different media. Although the primary storage 104 is illustrated separate from the client devices 102, it will be understood that at least a portion of the primary storage 104 can be internal and/or external (e.g., remote) to the one or more of the client devices 102.

In certain embodiments, data stored on the primary storage 104 is advantageously organized and/or cataloged through a file system 110. In yet further embodiments, the client devices 102 of the data migration system 100 can access the data on the primary storage 104 and/or secondary storage 106 either directly or through means other than the switch 108.

As shown, each of the client devices 102 comprises one or more applications 112 residing and/or executing thereon. In certain embodiments, the applications 112 can comprise software applications that interact with a user to process data on primary storage 104 and may include, for example, database applications (e.g., SQL applications), word processors, spreadsheets, financial applications, management applications, e-commerce applications, browsers, combinations of the same or the like. In particular, the applications 112 are able to interface with the file system 110 and data on the primary storage 104 through a corresponding file system driver 114.

Each of the client devices 102 further comprises a migration service 116 configured to transfer data from primary storage 104 to secondary storage 106. In certain embodiments, the migration service 116 comprises a userspace backup application. For instance, the migration service 116 can be configured migrate data from primary storage 104 to secondary storage 106 (e.g., tape or magnetic storage) based on one or more storage polices, criteria defined by the user, combinations of the same or the like. In yet other embodiments, the migration service 116 is configured to perform one or more of the following copy operations: creation, storage, retrieval, auxiliary copies, incremental copies, differential copies, HSM copies, archive copies, ILM copies or the like.

In certain embodiments, when the migration service 116 moves data from primary storage 104 to secondary storage 106, the migration service 116 replaces the original data on the primary storage 104 with a stub file in order to conserve space on the primary storage 104. This stub, as discussed above, can comprise metadata that allows for the actual data to be restored from secondary storage 106 when requested, for example, by the application 112.

For instance, in certain embodiments of the invention, components of the data migration system 100 can use Data Management API (DMAPI) persistent file attributes to store metadata and/or mark files as stubs. Other embodiments can store metadata as plain text data, surrounded by signatures and/or checksums, inside the stub file.

In certain embodiments, the file system driver 114 is located between the application 112 and the file system 110 and intercepts file system operations, such as read, write and rename operations from the application 112. When the file system driver 114 detects that the application 112 wants to read from a file that has been replaced by a stub, the file system driver 114 posts a recall request to the migration service 116 and blocks the application 112 from accessing the data until the file data has been restored back from secondary storage 106. In certain embodiments, the migration service 116 advantageously restores the migrated data in a manner that is transparent to the application 112 that requested the data.

Although the migration service 116 has been described with reference to both migrating data from primary storage 104 to secondary storage 106, placing stubs, and communicating with the file system driver 114 to restore migrated data, it should be understood that multiple modules can be used to perform such functions. For example, the data migration system 100 can comprise one or more backup modules that migrate the data and place stubs in the primary storage 104, while one or more restore modules are configured to receive the recall requests when the file system drivers 114 detect that an I/O request is directed to a stubbed file. Such restore modules can be configured to obtain the migrated data and restore the data to primary storage 104.

In certain embodiments, reading each requested file to determine if it represents a stub or an actual file data can be a slow and costly approach. Thus, as shown, the file system driver 114 of the data migration system 100 further comprises a driver cache 118, such as a driver-based inode cache. In certain embodiments, the driver cache 118 is configured to store information regarding the most recently accessed inodes, such as whether or not a particular inode represents an actual file and/or a stub.

For instance, whenever a file is being accessed or requested, the file system driver 114 can first perform a look-up of the file's inode in the driver cache 118. If the inode is present in the driver cache 118, the file system driver 114 can quickly determine that the file is a regular file without needing to directly access the file.

If information about the file is not present in the driver cache 118, the file system driver 114 can then access the file directly to determine if the file is a regular file or a stub file. In certain embodiments, the driver 114 reads a portion of the file and parses the metadata to determine if the file is a regular file or a stub file. If the file is a regular file, the driver 114 adds the file's inode to the driver cache 118. In certain further embodiments, cache pruning and/or adaptive hashing can be used to improve system performance by tracking the locations of the files and/or whether or not a particular file is an actual file or a stub file.

However, in a clustered file system environment, such as the data migration system 100, the information between driver caches 118 can become inconsistent. Because multiple applications 112 on multiple client devices 102 can access the same data on the primary storage 104, the file system driver 114 on an individual client device 102 no longer has exclusive control over the underlying files and may not be aware of file changes made through other file system drivers 114. Thus, in such circumstances, it becomes important to prevent other applications 112 from accessing the file when that file is being recalled or migrated (e.g., preventing one application 112 from reading a file at the same time another client device 102 is replacing the file with a stub).

In view of the foregoing, certain methods are disclosed hereinafter that can be used by the data migration system 100 to further address such "races" to file data between different nodes in a clustered file system and to maintain driver cache consistency. In particular, FIGS. 2-5 illustrate flowcharts of exemplary processes usable by the data migration system 100 in managing access to data in a clustered file system.

Figure 2:
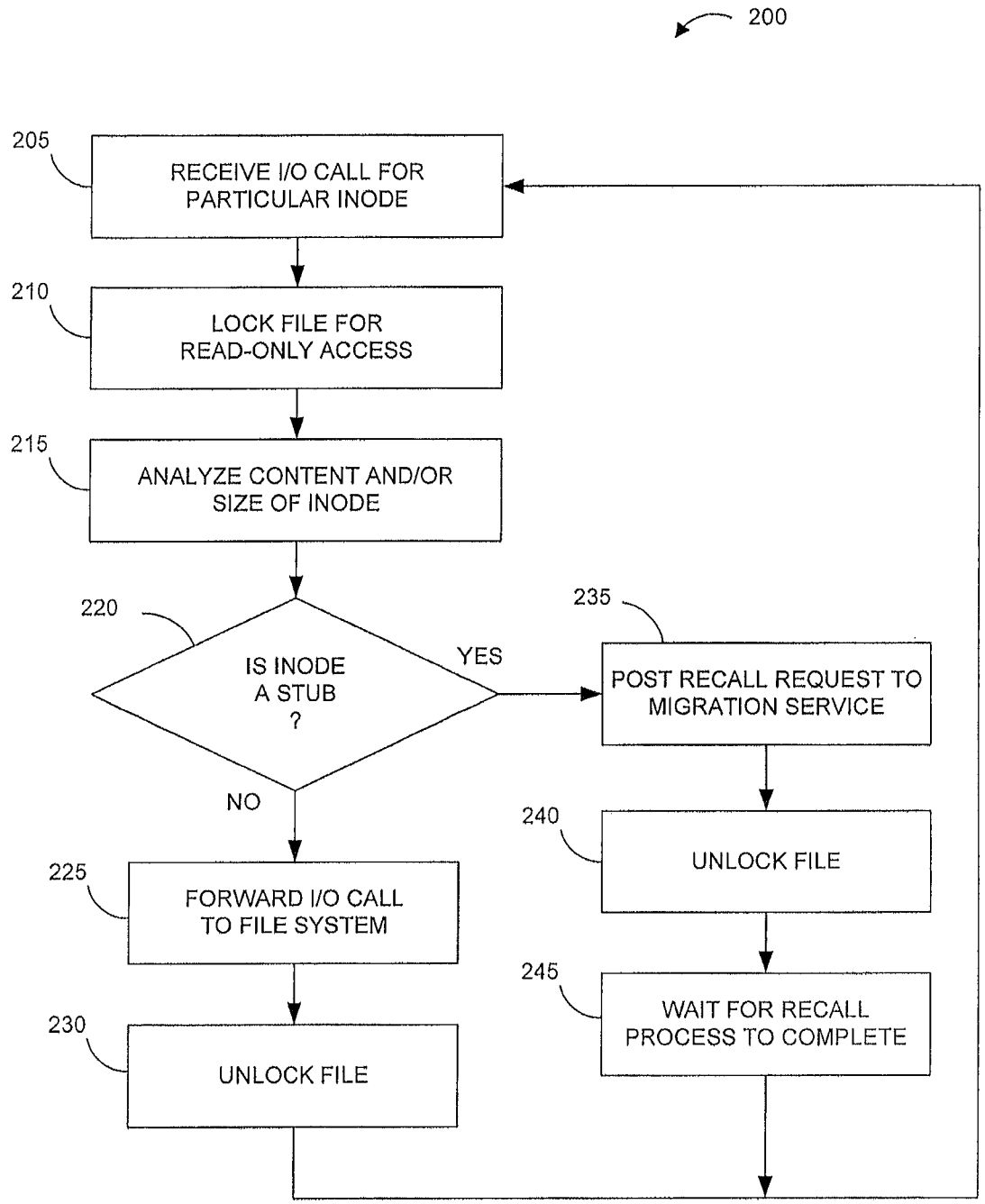
FIG. 2 illustrates a flowchart of an exemplary strict-locking process usable by the data migration system of FIG. 1 for processing file system operations.

FIG. 2 illustrates a flowchart of a strict-locking process 200 for processing file system operations in a clustered file system, according to certain embodiments of the invention. In summary, the process 200 provides for strict, file system locking of a particular file each time an intercepted I/O call pertains to the file. In certain embodiments, the process 200 reduces races with migration, recall and/or restore processes that can be executed by other cluster nodes and change the status of a file while, at the same time, an I/O request for the same file is being forwarded from another cluster node. For exemplary purposes, the process 200 will be described with reference to the components of the data migration system 100 of FIG. 1.

As illustrated, the process 200 begins at Block 205, wherein the file system driver 114 intercepts an I/O call (e.g., a read or write operation) for a particular inode. The file system driver 114 then locks the corresponding file for read-only (RO) or read-write (RW) access (Block 210). In certain embodiments, the file system driver 114 utilizes the file system locks available through an fcntl( ) interface.

After the file is locked, the file system driver 114 analyzes the contents and/or size of the inode (Block 215) to determine if the inode contains the actual data file or a stub (Block 220). For instance, the file system driver 114 can read a portion, such as the first block(s), of the file to determine if the file is a regular file. In other embodiments, the file system driver 114 can determine that the file is a stub if the size of the file is on the order of several kilobytes. In yet other embodiments, the file system driver 114 can access other metadata relating to the file (e.g., file attributes) to determine if the file is a stub.

If the inode does not represent a stub, the file system driver 114 forwards the I/O call to the file system 110 to perform the requested operation (Block 225). Once the operation is complete, the file system driver 114 unlocks the file (Block 230), and the process 200 returns to Block 205.

On the other hand, if at Block 220 the inode does represent a stub, the file system driver 114 posts a recall or restore request to the migration service 116 to obtain and restore the file data from secondary storage 106 to primary storage 104 (Block 235). At Block 240, the file system driver 114 unlocks the file and waits for the recall process to complete (Block 245), and the process 200 returns to Block 205.

The locking process 200 can be tolerable in environments, such as GPFS, where file system locking is relatively fast. As can be appreciated, however, such an indiscriminate locking process can be relatively slow in other file system environments, such as in PolyServe file systems or CFS environments where file access speed can be impacted dramatically (e.g., up to ten times slower). Moreover, the locking process 200 does not enjoy the performance benefits of utilizing the driver cache 118 to identify stubs.

Figure 3:
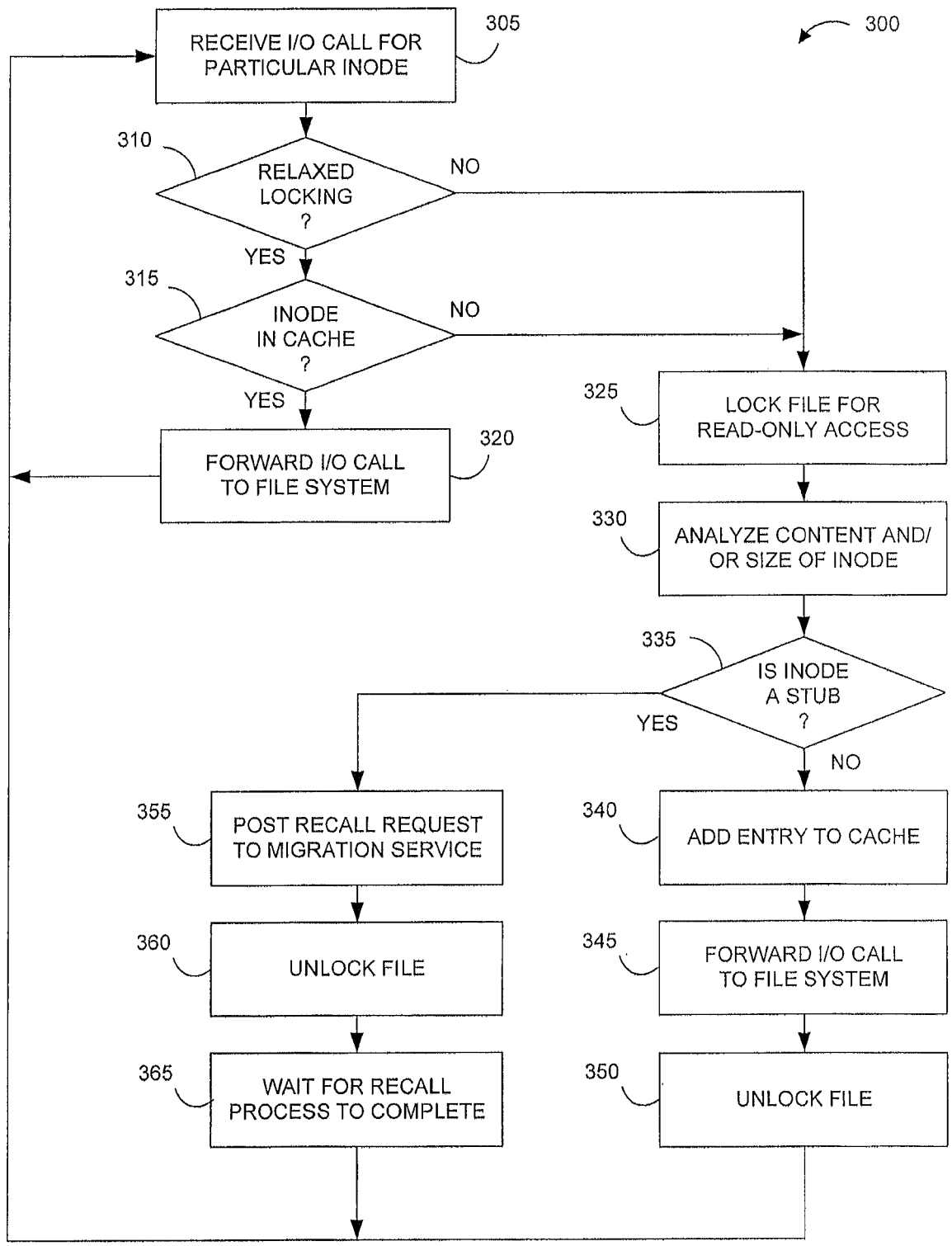
FIG. 3 illustrates a flowchart of an exemplary dual-locking process usable by the data migration system of FIG. 1 for processing file system operations.

FIG. 3 illustrates a flowchart of a dual-locking process 300 for processing file system operations, according to certain embodiments of the invention. In summary, the process 300 provides for both strict locking and relaxed-locking modes that facilitate driver cache consistency with respect to files on primary storage. The strict-locking mode is used during a relatively short time period when file migration is completing and the migrated contents of files are being replaced with stubs. The relaxed-locking mode is used by file system drivers more frequently, such as between migration jobs. For exemplary purposes, the process 300 will be described with reference to the components of the data migration system 100 of FIG. 1.

As illustrated, at Block 305, the file system driver 114 receives an I/O call for a particular inode. The process 300 then determines if the file system driver 114 for the particular client device 102 is operating in a relaxed-locking mode (Block 310). In certain embodiments, as discussed in more detail below with respect to FIGS. 4 and 5, such a determination can be based on a signaling process that alerts the driver to proceed with the strict-locking mode or the relaxed-locking mode. In yet other embodiments, other types of signaling, notifications, user-selectable options can be used to determine in which mode the driver 114 is to operate.

If the driver 114 is operating in a relaxed-locking mode, the file system driver 114 determines if the requested inode is present in the driver cache 118 (Block 315). In certain embodiments, the driver cache 118 advantageously maintains only information that indicates which inodes are known to be regular files (not stubs) and is used to expedite access to files on primary storage 104 that have not yet been migrated to secondary storage 106.

If the requested inode is present in the driver cache 118, the file system driver 114 immediately forwards the I/O call to the file system 110 to perform the requested operation (Block 320). The process 300 then returns to Block 305.

If the file system drivers 114 are not operating in a relaxed-locking mode (determined at Block 310) or, if at Block 315, the requested inode is not present in the driver cache 118, the process 300 commences a strict-locking procedure. In particular, the strict-locking procedure defined by Blocks 325 through 350 of the process 300 generally corresponds to the strict-locking process 200 of FIG. 2.

That is, at Block 325 the file system driver 114 locks the file for RO or RW access, and then the contents and/or size of the inode are analyzed (Block 330) to determine if the inode contains the actual data file or a stub (Block 335). If the inode does not represent a stub, the file system driver 114 adds an entry to the driver cache 118 identifying the inode as having a regular file (Block 340).

The file system driver 114 then forwards the I/O call to the file system 110 to perform the requested operation (Block 345). Once the operation is complete, the file system driver 114 unlocks the data file (Block 350), and the process 300 returns to Block 305.

On the other hand, if at Block 335 the inode does represent a stub, the file system driver 114 posts a recall request to the migration service 116 to obtain and restore the file data from secondary storage 106 to primary storage 104 (Block 355). At Block 360, the file system driver 114 unlocks the file and waits for the recall process to complete (Block 365), and the process 300 returns to Block 305.

In certain embodiments of the process 300, the file system driver 114 utilizes byte-range locking to avoid interference with locks created by user applications. For instance, during one or more blocks of the process 300, instead of locking the actual file, access to which is being intercepted by the file system driver 114, the file system driver 114 can lock a corresponding byte range in a dedicated zero-length file. In certain embodiments, such files are maintained in a directory of a root folder of each shared volume of the primary storage 104. As one example, if a file being accessed has inode number "inode_num", the file system driver 114 can lock byte range [inode_num, inode_num+1] in the zero-length file.

As can be appreciated, the process 300 can significantly increase the speed of processing I/O calls by using the driver cache 118 to identify inodes corresponding to regular files since no locking takes place as long as the file's inode is present in the driver cache 118 and the relaxed mode is active. When the information in the driver cache 118 can no longer be trusted (e.g., when migration is in progress), the process 300 will generally follow the strict-locking branch (e.g., Blocks 325-350).

Moreover, when operating with two locking modes, it can become important to implement a signaling procedure that notifies the file system drivers 114 on each of the client devices 102 that migration is taking place and/or is about to take place. With such signaling, the file system drivers 114 can flush their respective driver caches 118 since the migration can cause information in the driver caches 118 to no longer be consistent with the contents of the file system 110.

Figure 4:
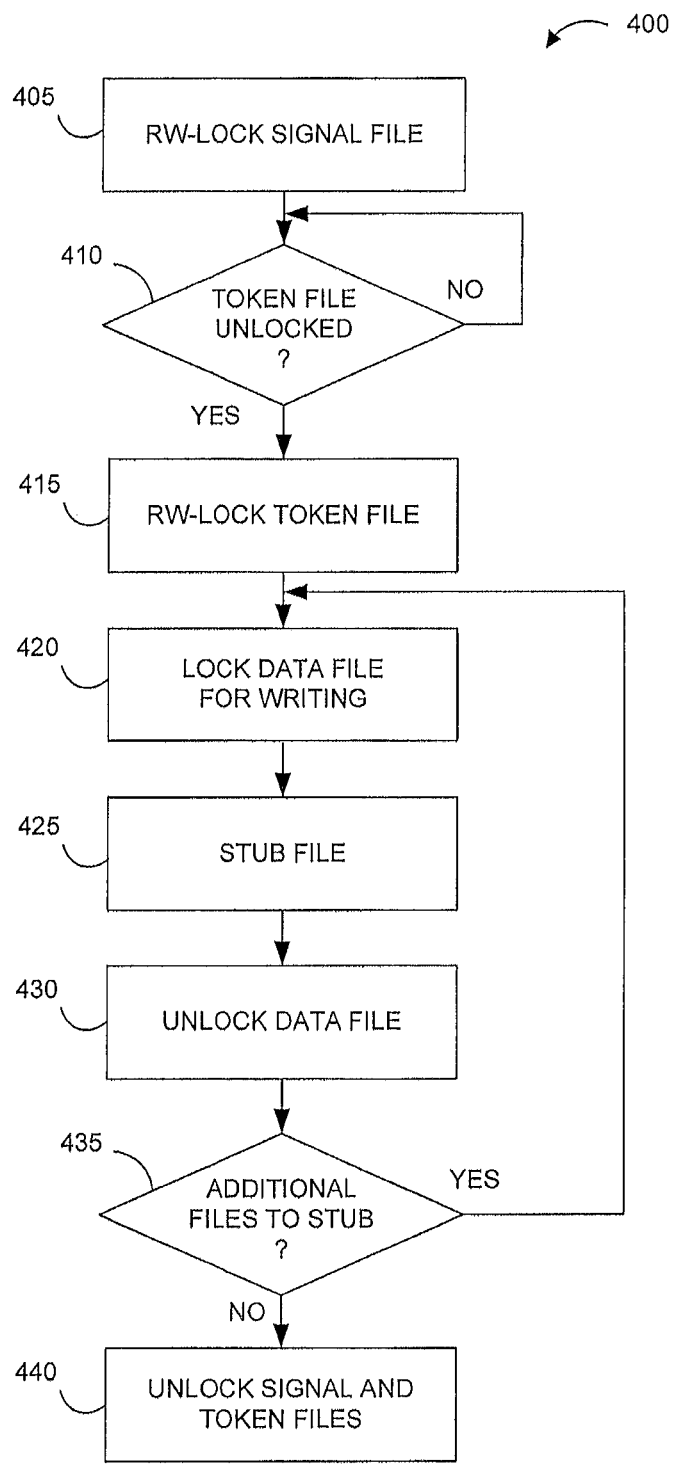
FIG. 4 illustrates a flowchart of an exemplary migration signal process usable by a migration service of a single node in the data migration system of FIG. 1.

FIG. 4 illustrates a flowchart of a migration signal process 400 usable by a migration service of a single node in a clustered file system. In general, FIG. 4 illustrates how a data migration service can signal drivers to switch between a strict-locking mode (e.g., FIG. 2) and a dual-locking mode (e.g., FIG. 3). In certain embodiments, the signal process 400 is carried out during a migration operation to alert all nodes of a clustered file system that such migration is taking place. For exemplary purposes, the process 400 will be described with reference to the components of the data migration system 100 of FIG. 1.

The process 400 utilizes two additional files for facilitating the management of data migration information: a token file and a signal file. The token file is generally RO-locked (e.g., a non-exclusive or shared lock) by file system drivers 114 on each node, and as long as the particular driver 114 holds this lock, the driver 114 works in the relaxed mode under the assumption that no migration service 116 from any client device 102 will try to perform migration on files in primary storage 104.

The signal file is used by the migration services 116 to notify the file system drivers 114 on all the client devices 102 that migration is about to begin. In certain embodiments, each of the file system drivers 114 has a dedicated thread that periodically attempts to RO-lock the signal file. As long as such RO-locking is possible, the file system driver 114 assumes that there is no migration service 116 currently operating in the data migration system 100, and the file system driver 114 operates in a relaxed-locking mode.

However, when the thread of the file system driver 114 determines that the signal file is read-write (RW) locked (e.g., an exclusive lock), the file system driver 114 unlocks the token file and begins to operate in a strict-locking mode. In certain embodiments, the file system driver 114 also, at this time, flushes its driver cache 118 because the file system driver 114 can no longer be certain that the driver cache 118 is consistent with the data on the primary storage 104. In certain embodiments, when the file system driver 114 on the final client device 102 detects the locked signal file and unlocks the token file, the migration service 116 obtains a RW-lock of the token file and begins the migration/stubbing process.

In certain embodiments, one or both of the token and signal files comprises a zero-length file stored in a subdirectory of the root directory of the file system 110. Working with such zero-length files can avoid interference with application-level locks that may be imposed by user applications on the same files.

As shown, the process 400 begins by the migration service 116 placing a RW-lock on the signal file. This action can alert the file system drivers 114 that migration/stubbing is about to begin. In certain embodiments, as discussed above, each of the file system drivers 114 includes a dedicated thread that periodically attempts to RO-lock the signal file (e.g., approximately every five seconds). Through these periodic lock attempts, once a file system driver 114 discovers that the signal file is RW-locked, the file system driver 114 determines that migration is to begin and releases any RO-lock on the token file.

At Block 410, the migration service 116 monitors the token file to determine when all the file system drivers 114 have released their RO-locks on the token file (Block 410). In general, the duration of this monitoring can take up to the time that is established for the file system drivers 114 to periodically check the signal file (e.g., approximately five seconds).

Once all the locks are released from the token file, the migration service 116 RW-locks the token file (Block 415). At Block 420, the migration service 116 also RW-locks a particular data file for writing. This can be especially advantageous in certain embodiments wherein the file system driver 114 does not trust the contents of its driver cache 118 and begins to lock data files during each I/O request. RW-locking the data file with the migration service 116 can avoid interference with the user I/O requests through the file system driver 114.

At Block 425, the migration service 116 stubs the particular data file. After stubbing, the migration service 116 unlocks the data file (Block 430) and determines if there are additional files to be stubbed (Block 435). If there are additional files, the process 400 returns to Block 420 to lock the additional data file for stubbing.

On the other hand, if migration and stubbing are complete, the process 400 proceeds with Block 435, and the migration service 116 releases its locks on both the signal and token files. When, through the repeated lock attempts of the signal file, the file system driver 114 recognizes that migration has complete (i.e., there is no longer the RW-lock on the signal file), the file system drivers 114 again RO-lock the token file, mark the driver caches 118 as valid and begin to repopulate the driver cache 118 entries as files are re-accessed.

Figure 5:
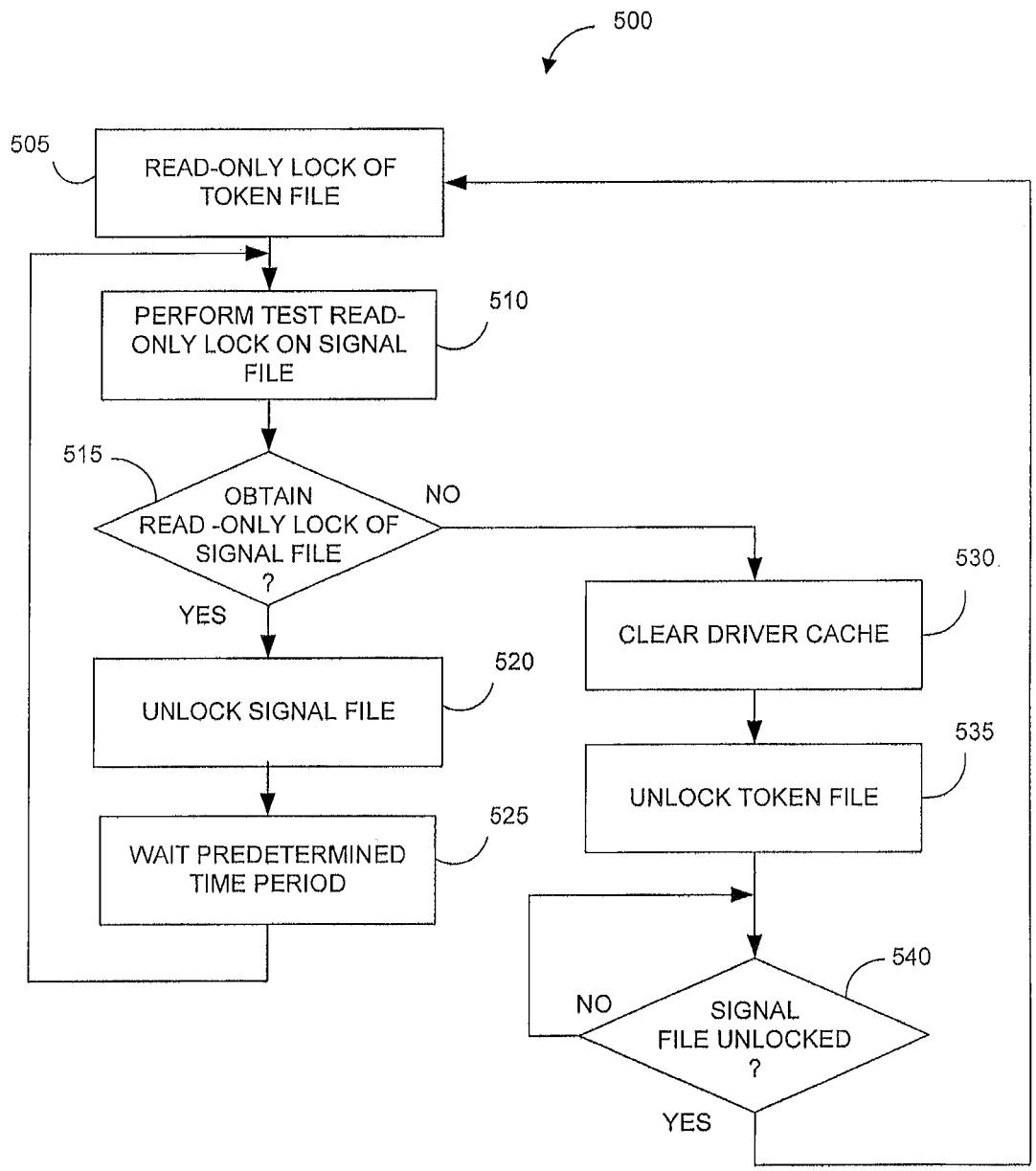
FIG. 5 illustrates a flowchart of an exemplary driver signaling process usable by a single node in the data migration system of FIG. 1.

FIG. 5 illustrates a flowchart of an exemplary driver signaling process 500 usable by a single file system driver 114 in a clustered file system. In general, FIG. 5 illustrates how drivers can listen to notifications sent by a data migration service and switch between locking modes. In certain embodiments, the signal process 500 is executed by a thread of each file system driver 114 to control the locking modes and maintain a driver cache consistent with the file system. For exemplary purposes, the process 500 will be described with reference to the components of the data migration system 100 of FIG. 1.

As shown, at Block 505, the file system driver 114 obtains or maintains a RO-lock of the token file. In certain embodiments, during this block, the file system driver 114 advantageously operates in a relaxed-locking mode. Moreover, as long as the file system driver 114 holds the RO-lock on the token file, the migration service 116 is prevented from migrating data files, and the driver cache 118 can be assumed to be consistent with the data of the file system 110.

At Block 510, the file system driver 114 performs a test lock, such as a RO-lock, of the signal file to determine if the migration service 116 is preparing to perform migration. As discussed above, in certain embodiments, the file system driver 114 includes a dedicated thread that periodically performs this locking attempt.

If at Block 515, the file system driver 114 is able to obtain a lock (e.g., RO-lock) of the signal file, the file system driver 114 proceeds to release the lock of the signal file (Block 520). The file system driver 114 then waits a predetermined time period (Block 525) and returns to Block 510 to perform another test lock of the signal file. In certain embodiments, the predetermined time period is between approximately two and ten seconds. In further embodiments, the predetermined time period is approximately five seconds. In yet other embodiments, the predetermined time period is less than two seconds or more than ten seconds, or may vary based on a storage policy, a user-defined preference or other criteria.

On the other hand, if at Block 515 the file system driver 114 is not able to lock the signal file (e.g., the signal file is already RW-locked by the migration service 116), the file system driver 114 flushes its driver cache 118 (Block 530) and releases its lock on the token file (Block 535). At this point, the file system driver 114 operates under a strict-locking mode with respect to any I/O requests.

The file system driver 114 continues to monitor for when the signal file is unlocked, signifying that the migration service has completed the stubbing process (Block 540). As discussed above, this monitoring can be performed by the dedicated thread of the file system driver 114 that periodically checks the signal file to see if it is unlocked. If it is determined that the signal file is unlocked, the process returns to Block 505, wherein the file system driver 114 again RO-locks the token file.

The processes described above with respect to FIGS. 3-5 can, in certain embodiments, provide one or more advantages in managing access to data. For instance, the processes 300, 400 and 500 are independent of the number of computer nodes or client devices in the cluster. Such data migration systems do not require a list of active cluster nodes, and notifications do not need to be sent to each node regarding migration of data.

The processes can also adequately respond to application crashes. For example, if the migration service 116 crashes after causing a cluster to operate in a strict-locking mode, the signal and token files that were locked by the migration service 116 can automatically be unlocked by the file system 110. When the file system drivers 114 are alerted to this, they can return to operating in the relaxed-locking mode.

Moreover, if an entire node crashes, this does not cause other file system drivers 114 to remain in a strict-locking mode. That is, the file system 110 can be configured to automatically release all locks held by a crashed node.

The above-described processes and methods are also file system and/or operating system independent if the file system 110 operates a fcntl( ) locking application programming interface (API) or an equivalent locking API.

Although data migration systems and methods have been disclosed herein with respect to particular configurations, other embodiments of the invention may take on different arrangements. For instance, other embodiments of the disclosed data migration systems can implement an alternative method for synchronizing driver cache contents. For instance, in certain embodiments, each of the driver caches 118 can communicate with each other to achieve consistency between their contents and the underlying clustered file system 110. Such a communication mechanism can, in certain embodiments, be implemented inside the file system drivers 114 and/or kernel (e.g., the file system drivers 114 opening socket connections directly to services running on other cluster nodes). In such embodiments, the synchronization communications between the driver caches 118 can be performed substantially simultaneously.

In yet other embodiments, flags associated with shared files on the file system could be checked periodically by the file system drivers 114 to determine if migration has occurred. In yet other embodiments, the file system drivers 114 could access a shared driver cache, accessible to all the drivers, that represents the contents of the primary storage.

Moreover, in certain embodiments of the invention, data migration systems and methods may be used in a modular storage management system, embodiments of which are described in more detail in U.S. Pat. No. 7,035,880, issued Apr. 5, 2006, which is hereby incorporated herein by reference in its entirety. For example, the data migration system may include multiple clients and/or media agents for accessing data on a common storage device. Moreover, one or more portions of the data migration system may be part of a storage operation cell that includes combinations of hardware and software components directed to performing storage operations on electronic data. Exemplary storage operation cells usable with embodiments of the invention include CommCells as embodied in the SIMPANA, QNET, and/or QINETIX storage management systems by CommVault Systems, Inc. (Oceanport, N.J.), and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions, which execute on the computer or other programmable apparatus, provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A computer-implemented method of coordinating access to data in a data storage management system, the method comprising:
   receiving a first request for a read-only lock on a signal file, wherein a locking status of the signal file indicates whether a migration operation is about to occur;
   receiving a second request for the read-only lock on the signal file, wherein the first request and second request are not received contemporaneously;
   in response to the first request for the read-only lock on the signal file being granted:
      unlocking the signal file and re-requesting the read-only lock on the signal file after a predetermined period, and
      operating in a first locking mode for requests to access a first file, the operating in the first locking mode comprising:
         determining whether an associated driver cache includes information regarding the first file, and
         in response to determining that the associated driver cache includes information regarding the first file, determining whether the first file is a stub file based on the associated driver cache; and
   in response to the second request for the read-only lock on the signal file being denied:
      clearing the associated driver cache storing information that indicates whether the first file stored on a primary storage device is a stub file, and
      operating in a second locking mode for requests to access the first file, the operating in the second locking mode comprises refraining from using the associated driver cache to determine whether the first file is a stub file.

2. The method of claim 1, wherein the first and second requests are requested by file system drivers of one or more computing devices.

3. The method of claim 2, wherein the one or more computing devices is an independent node of a clustered file system.

4. The method of claim 1, further comprising: in response to the second request for the read-only lock on the signal file being denied: releasing a second read-only lock on a token file.

5. The method of claim 4, further comprising: performing the migration operation of the first file only after no second read-only locks remain on the token file.

6. The method of claim 4, further comprising: obtaining with a migration service an exclusive lock on both the signal and token files prior to performing the migration operation.

7. The method of claim 1, wherein the second locking mode is stricter than the first locking mode.

8. The method of claim 1, further comprising: in response to a determining that the associated driver cache does not include information regarding the first file, analyzing a size or content of one or more inodes associated with the first file to determine whether the first file is a stub file.

9. The method of claim 1, further comprising populating the associated driver cache with at least one or more inodes associated with the first file.

10. A data storage management system comprising:
   one or more computing devices comprising one or more processors and computer memory, the one or more computing devices is configured to:
   receive a first request for a read-only lock on a signal file, wherein a locking status of the signal file indicates whether a migration operation is about to occur;
   in response to the first request for the read-only lock on the signal file being granted:
      unlock the signal file and re-requesting the read-only lock on the signal file after a predetermined period, and
      operate in a first locking mode for requests to access a first file, the operating in the first locking mode comprising:
         determine whether an associated driver cache includes information regarding the first file, and
         upon determining that the associated driver cache includes information regarding the first file, determine whether the first file is a stub file based on the associated driver cache;
   receive a second request for the read-only lock on the signal file, wherein the first request and second request are not received contemporaneously; and
   in response to the second request for the read-only lock on the signal file being denied:
      clear the associated driver cache storing information that indicates whether the first file stored on a primary storage device is a stub file, and operate in a second locking mode for requests to access the first file, comprising refraining from using the associated driver cache to determine whether the first file is a stub file.

11. The data storage management system in claim 10, wherein the first and second requests are requested by file system drivers of the one or more computing devices.

12. The data storage management system in claim 11, wherein the one or more computing devices is an independent node of a clustered file system.

13. The data storage management system in claim 10, wherein the one or more computing devices is further configured to: release a second read-only lock on a token file in response to the second request for the read-only lock on the signal file being denied.

14. The data storage management system in claim 13, wherein the one or more computing devices is further configured to: perform the migration operation of the first file only after no second read-only locks remain on the token file.

15. The data storage management system in claim 13, wherein the one or more computing devices is further configured to: obtain, with a migration service, an exclusive lock on both the signal and token files prior to performing the migration operation.

16. The data storage management system in claim 10, wherein the second locking mode is stricter than the first locking mode.

17. The data storage management system in claim 10, wherein the one or more computing devices is further configured to: analyze a size of content of one or more inodes associated with the first file to determine whether the first file is a stub file in response to determining that the associated driver cache does not include information regarding the first file.

18. The data storage management system in claim 10, wherein the one or more computing devices is further configured to: populate the associated driver cache with at least one or more inodes associated with the first file.

* * * * *